No. 790,264. PATENTED MAY 16, 1905.
T. C. ROSELAND.
ROTARY ENGINE.
APPLICATION FILED APR. 3, 1905.
3 SHEETS—SHEET 2.
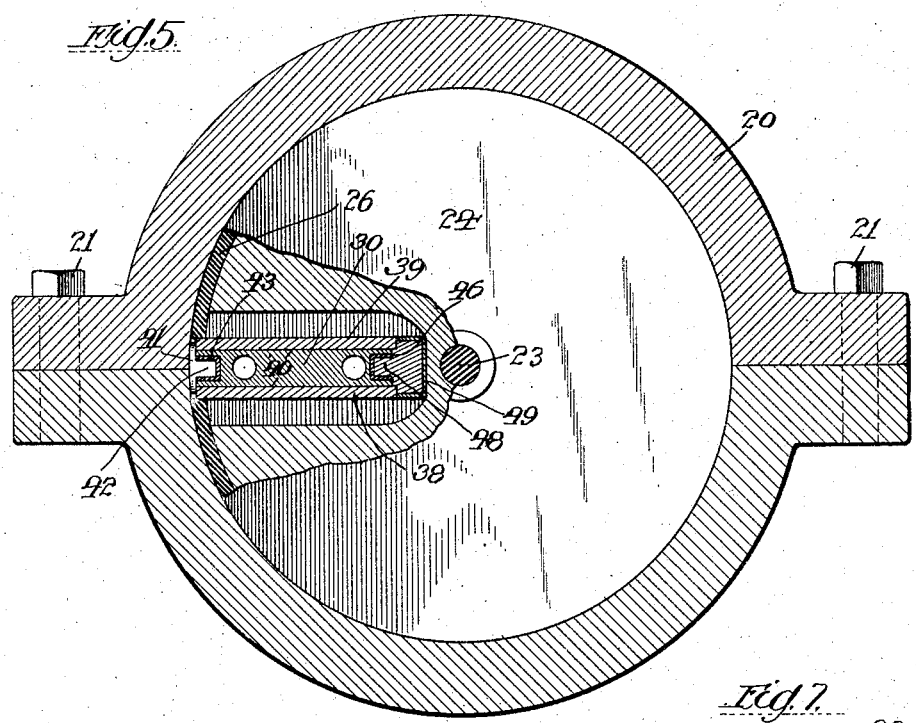
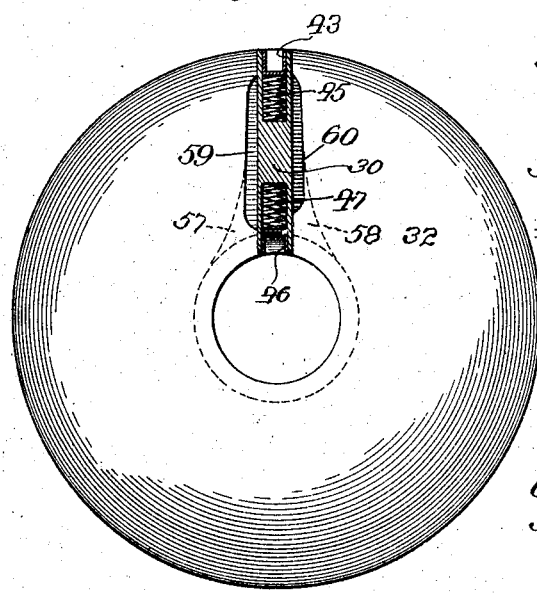
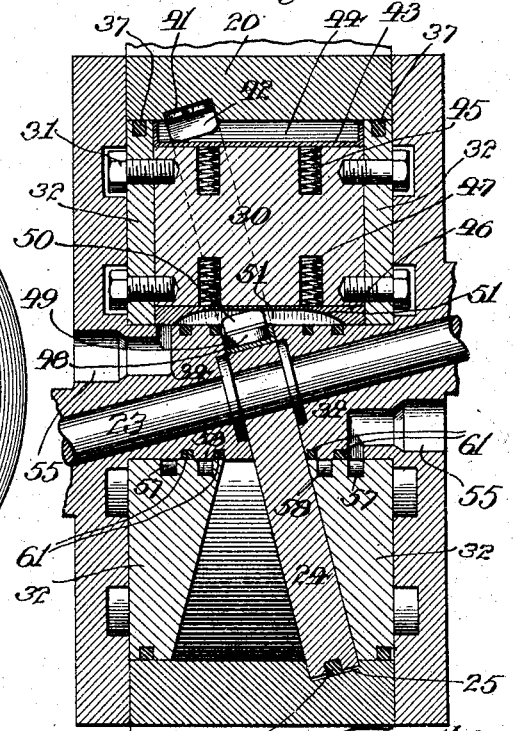
Witnesses:
Inventor:
Tobias C. Roseland

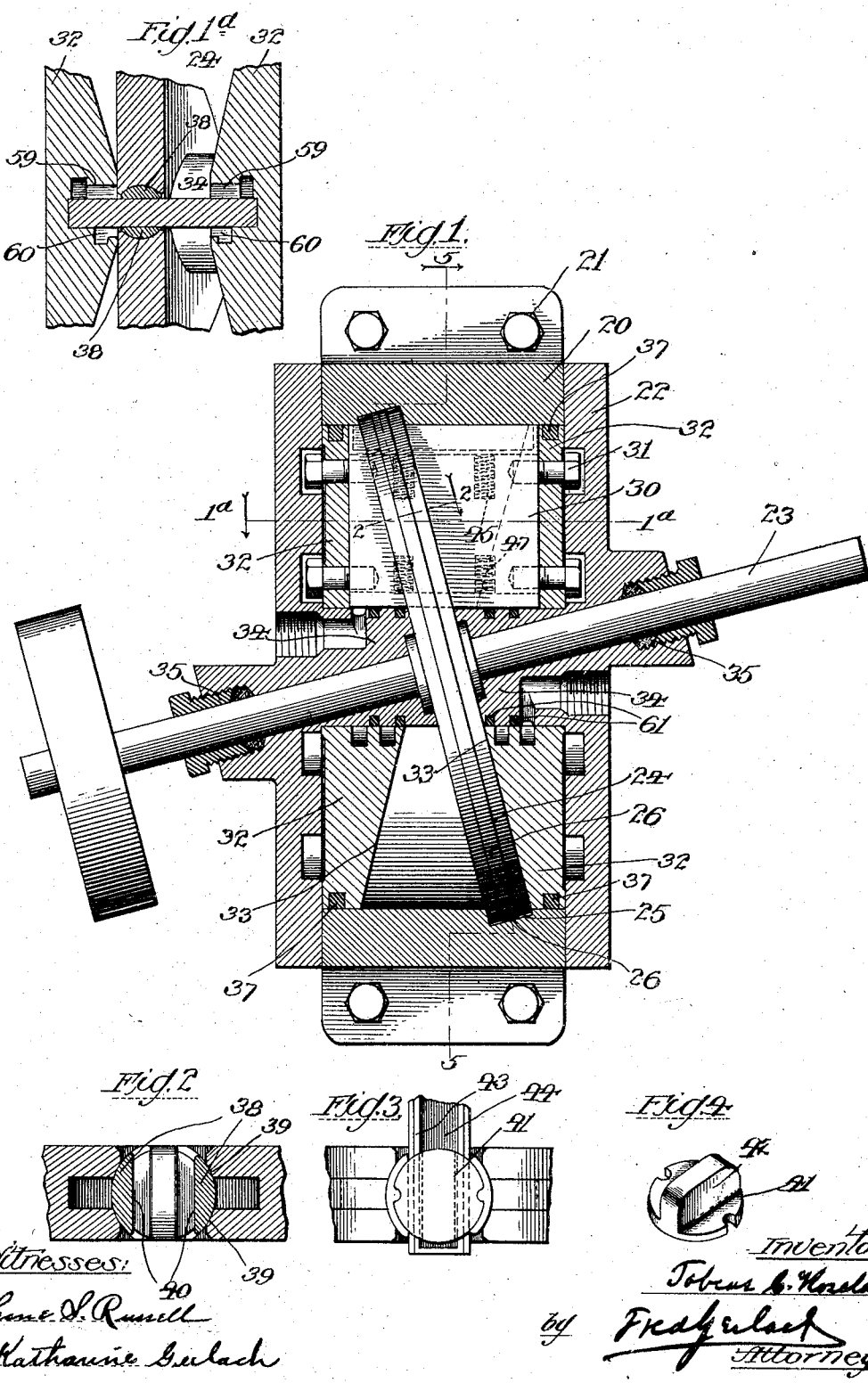

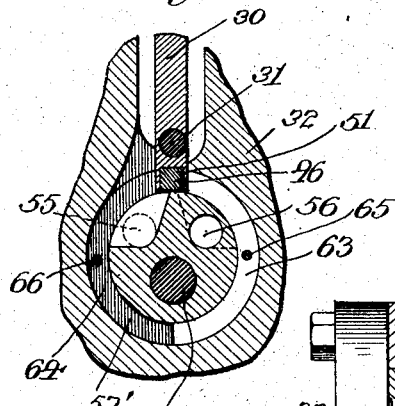
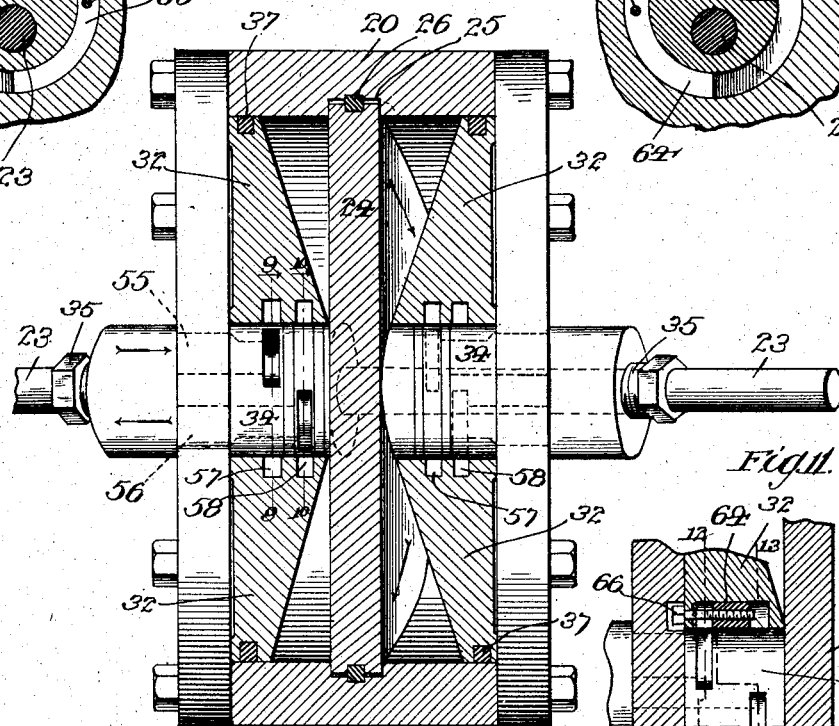
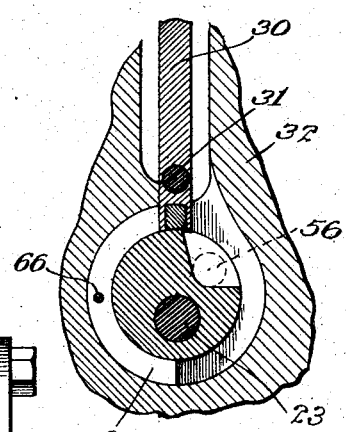
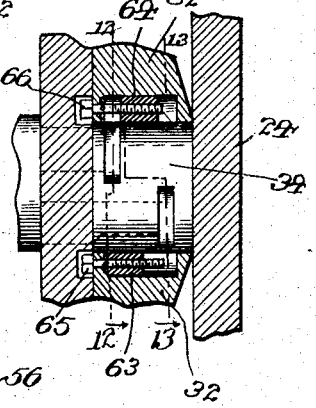
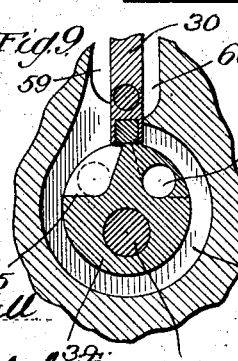
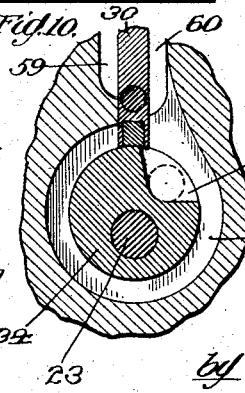

No. 790,264. Patented May 16, 1905.

UNITED STATES PATENT OFFICE.

TOBIAS C. ROSELAND, OF GILMAN, IOWA, ASSIGNOR OF ONE-HALF TO PETER J. JACOBSON, OF GILMAN, IOWA.

ROTARY ENGINE.

SPECIFICATION forming part of Letters Patent No. 790,264, dated May 16, 1905.

Application filed April 3, 1905. Serial No. 253,433.

*To all whom it may concern:*

Be it known that I, TOBIAS C. ROSELAND, a resident of Gilman, in the county of Marshall and State of Iowa, have invented certain new and useful Improvements in Rotary Engines, of which the following is a full, clear, and exact description.

The invention relates to rotary engines, and more particularly to that type commonly known as "disk-engines."

The invention designs to provide a rotary engine of this type which is simple in construction and efficient in operation; and it consists in the novel features hereinafter set forth, and more particularly defined by claims at the conclusion hereof.

In the drawings, Figure 1 is a horizontal section of a rotary engine embodying the invention, the piston and the disk being shown in elevation. Fig. 1$^a$ is a section taken on line 1$^a$ 1$^a$ of Fig. 1. Fig. 2 is a detail section on line 2 2 of Fig. 1 upon an enlarged scale, showing the universal joint between the piston and the disk. Fig. 3 is a detail view of the same. Fig. 4 is a perspective of the plug at the outer end of said universal joint. Fig. 5 is a section on line 5 5 of Fig. 1, a portion of the disk being shown in section. Fig. 6 is a detail side view of one of the rotating heads, the piston being shown in section therein. Fig. 7 is a central horizontal section similar to Fig. 1, the piston and disk being shown in section. Fig. 8 is a side elevation, the cylinder, disk, and revoluble heads being shown in section. Fig. 9 is a section taken on line 9 9 of Fig. 8. Fig. 10 is a section taken on line 10 10 of Fig. 8. Fig. 11 is a view in horizontal section, showing a modified form of the invention. Figs. 12 and 13 are sections taken on lines 12 and 13, respectively, of Fig. 11.

The casing comprises a cylindrical body 20, usually formed of sections and secured together by bolts 21, and cylinder heads or sides 22, bolted to the cylinder. A drive-shaft 23 is journaled in the casing and extends diagonally through the casing—*i. e.*, at an angle with respect to the axis of the cylinder. A disk 24, rigidly secured to the shaft, extends diagonally across the cylinder, and its sides are perpendicularly arranged with respect to said shaft. The periphery of the disk is fitted in a groove 25, formed in the cylinder 20, and is provided with a packing-ring 26 for closing communication between the chambers on opposite sides of the disk, respectively. It will be observed that the disk is rigidly secured to the shaft, which is driven by the engine. An important resultant advantage of this construction is that the use of a loose disk and the friction of the parts due to lateral strains against a loose disk are avoided, because the disk is supported by the shaft. The disk divides the space in the chamber into two separate chambers.

A piston 30 extends transversely through the disk and is bolted, as at 31, to a pair of revolving heads 32, which are concentrically mounted in the cylinder and are respectively arranged on opposite sides of the disk and provided with conical faces 33, contacting with the sides of the disk at diametrically opposite points. The revolving heads form the outer sides of the steam-chambers at the sides of the disk. The cylinder sides 22 are each provided with an inwardly-extending journal 34, on which the revolving heads are mounted and which are extended into close proximity to the sides of the disk. Shaft 23 extends through said journals, and is thereby well supported in the sides of the casing and also firmly supported adjacent the disk. Furthermore, the inner ends of these journals fitting against the faces of the disk aid in sustaining the disk. Packing-boxes 35 are provided to prevent leakage of the motive agent around the shaft. The peripheries of the rotating heads are provided with packing-rings 37 for preventing escape of the motive agent from the chambers between the heads. To prevent passage of the motive agent from the chamber on one side of the disk to that on the other, a universal joint is provided, which comprises a pair of strips 38, having curved outer faces fitting against correspondingly-curved sides 39 in the disk and flat faces 40, fitting against the sides of the piston. A plug 41 (see Fig. 4) connects said strips at their outer ends, fills the opening between the strips, and effectively prevents leakage of the expansive fluid from one side of the piston to the other. The head of this plug is formed to travel in groove 25 of the cylinder and is provided with a rib 42, fitting into a channeled strip 43, which extends transversely across the piston, is guided in a groove or channel 44, formed in the outer edge of the piston, and is pressed against the cylinder-walls by spring 45. A fluid-tight joint at the inner end of the piston comprises a strip 46, which is pressed against the journals 34 by springs 47. A plug 48, swiveled in a sleeve 49 and provided with a rib 50, extended in a groove 51 in strip 46, provides a suitable joint between the inner end of the piston and the disk, whereby leakage from one chamber to the other is avoided.

Ducts for the supply and exhaust of steam are formed in the casing sides 22 and at each side thereof, so the fluid will be supplied and exhausted simultaneously from the chambers on the opposite sides of the disk. Ports 55 and 56 are formed in each of the casing sides and extend inwardly through the journals 34 and open on the periphery of the journal, so as to communicate, respectively, with annular ducts 57 and 58, formed in each of the revoluble heads 32, respectively. Duct 57 communicates with an opening 59, formed on the inner face of the revoluble head at one side of the piston, and duct 58 communicates with an opening 60, opening on the other side of the piston. Similar ports are provided at the opposite side of the cylinder, and these are arranged diametrically opposite to the inlet and exhaust ports at the other side, the purpose of this construction being to provide a maximum piston exposure in the chamber at one side when the minimum exposure of piston-surface occurs at the other side. Packing-rings 61 in journals 34 provide suitable joints between the journals 34 and the heads, whereby leakage of fluid from the ducts 57 and 58 is prevented.

The operation of the improved engine is as follows: Assuming that steam or other expansive fluid is supplied to port 55, it will pass from said port to annular duct 57, thence to opening 59 at one side of the piston, and will force the piston in the direction indicated by arrows in Fig. 8, the line of contact between the disk and revoluble head preventing passage of the steam to the opposite side of the piston, said line being located between the ports 55 and 56. The exhaust of the steam in front of the piston, which is the charge used for driving the cylinder the immediately-preceding revolution, will exhaust through opening 60, duct 58, and port 56. It will be understood that steam will also be supplied to and exhausted from ports 55 and 56 on the opposite sides of the cylinder, and by locating the ports on one side diametrically opposite to those on the other side of the disk the beginning of a revolution or stroke at one side occurs while the piston has a maximum exposure on the other side. In other words, the total exposed piston area remains the same throughout a revolution. This results in even pressure throughout. This construction permits the engine to be driven in either direction by merely admitting steam through ports 56 instead of ports 55, and then the ports 55 serve as exhaust-ports.

In some instances it is desirable to allow the piston to cut off the supply of steam during a part of the revolution of the piston, so the piston will be driven by expansion of the steam confined in the chamber. In Figs. 11, 12, and 13 there is shown a construction susceptible of such operation. For this purpose the duct in the revoluble head for conducting steam from the port 55 to the opening 59 is partly closed, so there will be communication between the duct 57' and the port 55 during a part of a revolution only, while the port used as an exhaust-port will be at all times in communication with the other port. To make it possible to adapt the engine for operation in either direction, an adjustable ring, formed of sections 63 and 64, is provided. These sections are held in an annular groove and are each laterally adjustable by screws 65 and 66, so that when the engine is to be operated in one direction the duct through which steam is admitted can be blocked during a part of the revolution, while the exhaust-duct will be in constant communication with the exhaust-port. By adjustment of these sections either of the ducts can be made to serve as a supply during a part of the revolution, while the other is in constant communication with the port used as an exhaust-port.

Thus it will be seen that the invention provides an improved rotary disk-engine in which the disk is rigidly secured to the shaft, which is diagonally mounted with respect to the revolving heads. The engine can be driven in either direction. The engine is also adapted to be operating during a portion of each stroke by expansion, and by adjustment the engine can be reversed and operated in reverse direction by expansion during a part of each stroke.

Having thus described the invention, what I claim as new, and desire to secure by Letters Patent, is—

1. In a rotary engine, the combination of a casing, a shaft extending diagonally through the casing, a disk rigidly secured to said shaft and extending diagonally across the chamber in the casing, a revoluble head at each side of the disk eccentrically mounted with respect to the shaft, a piston secured to rotate with the heads, and supply and exhaust ports for the chambers at the sides of the disk.

2. In a rotary engine, the combination of a cylindrical casing, a shaft extending diagonally through the casing, a disk rigidly secured to said shaft and extending diagonally across the chamber in the casing, a revoluble conical head at each side of the disk, eccentrically mounted with respect to the shaft, and concentrically in said chamber, a piston rigidly secured to the head and extended through the disk, and supply and exhaust ports for the chambers at the sides of the disk.

3. In a rotary engine, the combination of a casing, a shaft extending diagonally through the casing, a disk secured to said shaft and extending diagonally across the chamber in the casing, a revoluble head at one side of the disk eccentrically mounted with respect to the shaft, a journal for said head extending inwardly from the casing and on which the head is mounted concentrically with respect to the chamber in the casing, a piston rigidly secured to said head and extending through the disk, and supply and exhaust ports for the chambers at the sides of the disk.

4. In a rotary engine, the combination of a casing, a shaft extending diagonally through the casing, a disk rigidly secured to said shaft and extending diagonally across the chamber in the casing, a revoluble head at each side of the disk, journals extending inwardly from the casing and on which the heads are mounted to revolve concentrically in said chamber, a piston rigidly secured to said heads and extending through the disk, and supply and exhaust ports for the chambers at the sides of the disk.

5. In a rotary engine, the combination of a casing, a shaft extending diagonally through the casing, a disk rigidly secured to said shaft and extending diagonally across the chamber in said casing, a revoluble head at each side of the disk, journals projecting inwardly from the sides of the casing and on which said heads are eccentrically mounted in said chamber, a piston rigidly secured to the heads and extending through the disk and to travel around said journal, and supply and exhaust ports for the chambers at the sides of the disk.

6. In a rotary engine, the combination of a casing, a shaft extending diagonally through the casing, a disk rigidly secured to said shaft and extending diagonally across the chamber in said casing, a revoluble head at each side of the disk, journals projecting inwardly from the sides of the casing and on which said heads are eccentrically mounted in said chamber, a piston rigidly secured to the heads and extending through the disk and to travel around said journal, a packing between said journal and the inner edge of the piston, and supply and exhaust ports for the chambers at the sides of the disk.

7. In a rotary engine, the combination of a casing, a shaft extending diagonally through the casing, a disk rigidly secured to said shaft and extending diagonally across the chamber in the casing, a revoluble head at one side of the disk, a journal extending through said head and on which the head is mounted, supply and exhaust ports extending through said journals, and opening on the periphery thereof, a piston secured to the head and extending through the disk, and ports for the motive agent communicating respectively with the ports in the journal and leading to the opposite sides of the piston respectively.

8. In a rotary engine, the combination of a casing, a shaft extending diagonally through the casing, a disk rigidly secured to said shaft and extending diagonally across the chamber in the casing, a revoluble head at each side of the disk, journals extending inwardly from the sides of the casing on which the heads are mounted, supply and exhaust ports extending through said journals and opening on the periphery thereof, a piston secured to the heads and extending through the disk, and ports for the motive agent communicating respectively with the ports in the journal and leading to the opposite sides of the piston respectively.

9. In a rotary engine, the combination of a casing, a shaft extending diagonally through the casing, a disk rigidly secured to said shaft and extending diagonally across the chamber in the casing, a revoluble head at each side of the disk, journals extending inwardly from the sides of the casing on which the heads are mounted, supply and exhaust ports extending through said journals and opening on the periphery thereof, a piston secured to the heads and extending through the disk, a packing between the piston and said journals, and ports for conducting the motive agent from the ports in the journal to the opposite sides of the piston respectively.

10. In a rotary engine, the combination of a casing, in which a cylinder is formed, a shaft extending diagonally through the casing, a disk extending diagonally across the chamber in said casing and rigidly secured to said shaft, a revoluble head at one side of the disk, supply and exhaust ports for the chamber between the disk and the head, and means whereby either of said ports can be cut off during a part of each stroke so the engine can be expansively driven in either direction.

11. In a rotary engine, the combination of a casing in which a cylinder is formed, a shaft extending diagonally through the casing, a disk extending diagonally across the cylinder and rigidly secured to said shaft, a revoluble head at each side of the disk, supply and exhaust ports for the chambers between the disk and the heads, and means whereby either of said ports can be cut off during a part of each stroke so the engine can be expansively driven in either direction.

TOBIAS C. ROSELAND.

Witnesses:
C. H. E. BOARDMAN,
WILLIAM I. CRANE.